United States Patent
Kato et al.

(10) Patent No.: US 8,109,169 B2
(45) Date of Patent: Feb. 7, 2012

(54) BALL SCREW DEVICE

(75) Inventors: Masato Kato, Maebashi (JP); Yoshinori Mizumura, Maebashi (JP); Takayuki Yabe, Maebashi (JP)

(73) Assignee: NSK Ltd., Tokyo (JP)

( * ) Notice: Subject to any disclaimer, the term of this patent is extended or adjusted under 35 U.S.C. 154(b) by 579 days.

(21) Appl. No.: 10/548,352

(22) PCT Filed: Mar. 8, 2004

(86) PCT No.: PCT/JP2004/002935
§ 371 (c)(1),
(2), (4) Date: Jun. 27, 2006

(87) PCT Pub. No.: WO2004/079228
PCT Pub. Date: Sep. 16, 2004

(65) Prior Publication Data
US 2006/0243077 A1   Nov. 2, 2006

(30) Foreign Application Priority Data
Mar. 7, 2003 (JP) .................................. 2003-061882

(51) Int. Cl.
*F16H 25/22* (2006.01)
(52) U.S. Cl. ............... 74/424.87; 74/424.71; 74/424.82; 74/424.86
(58) Field of Classification Search ............... 74/424.71, 74/424.82, 424, 86, 424.87
See application file for complete search history.

(56) References Cited

U.S. PATENT DOCUMENTS

| | | | | |
|---|---|---|---|---|
| 2,674,899 A | * | 4/1954 | Gobereau ................ | 74/424.87 |
| 2,780,943 A | * | 2/1957 | Stump ..................... | 74/424.87 |
| 3,367,201 A | * | 2/1968 | Orner ...................... | 74/424.86 |
| 3,512,426 A | * | 5/1970 | Dabringhaus ............. | 74/424.87 |
| 3,667,311 A | * | 6/1972 | Wysong .................... | 74/424.75 |
| 4,357,838 A |   | 11/1982 | Blaurock et al. | |

(Continued)

FOREIGN PATENT DOCUMENTS

EP    1 281 894 A2    2/2003
(Continued)

OTHER PUBLICATIONS

European Search Report dated May 6, 2008 (Five (5) pages).
Japanese office action dated Oct. 23, 2006 with English Translation (Eight (8) pages).

*Primary Examiner* — James Pilkington
*Assistant Examiner* — Thomas Diaz
(74) *Attorney, Agent, or Firm* — Crowell & Moring LLP

(57) ABSTRACT

A ball screw device 10 capable of increasing a load capacity by increasing the size of ball diameter and the number of threads by preventing the cutout of a nut from being interfered with a thread groove adjacent to the cutout even in the thread groove of a small lead screw and a multiple thread screw, wherein a circulating block 18 forming, in association with the cutout 17, a ball 15 circulation passage 21 for communicating an area between both thread grooves 11 and 13 with a ball return passage 16 is fitted to the cutout 17 formed at the end of the nut 14 so that the large number of balls 15 can be endlessly circulated between both thread grooves 11 and 13, ball circulation passage 21, and ball return passage 16. The face of the cutout 17 facing the axial direction thereof is used as a ball running surface 23, a ball circulating groove 20 is formed at the portion of the circulation block 18 opposed to the ball running surface 23, and the ball circulation passage 21 is formed of the ball circulating groove 20 and the ball running surface 23.

2 Claims, 9 Drawing Sheets

U.S. PATENT DOCUMENTS

| | | | |
|---|---|---|---|
| 5,664,459 A * | 9/1997 | Muhleck et al. | 74/424.87 |
| 5,791,192 A * | 8/1998 | Lee | 74/424.87 |
| 6,454,042 B1 | 9/2002 | Yoshida et al. | |
| 6,561,053 B2 | 5/2003 | Greubel | |
| 2001/0022110 A1* | 9/2001 | Roland | 74/424.87 |
| 2001/0025540 A1* | 10/2001 | Greubel | 74/424.87 |
| 2002/0003059 A1* | 1/2002 | Yoshioka et al. | 180/444 |
| 2003/0213323 A1* | 11/2003 | Hayashi | 74/424.87 |
| 2004/0211280 A1 | 10/2004 | Nishimura et al. | |

FOREIGN PATENT DOCUMENTS

| | | |
|---|---|---|
| JP | 55-139550 A | 10/1980 |
| JP | 05-099293 A | 4/1993 |
| JP | 3034052 | 11/1996 |
| JP | 2001-21018 A | 1/2001 |
| JP | 2001-132811 A | 5/2001 |
| JP | 2001-280439 A | 10/2001 |
| WO | WO 03/021133 A1 | 3/2003 |

* cited by examiner

DIRECTION OF BALL MOVEMENT

F I G. 17
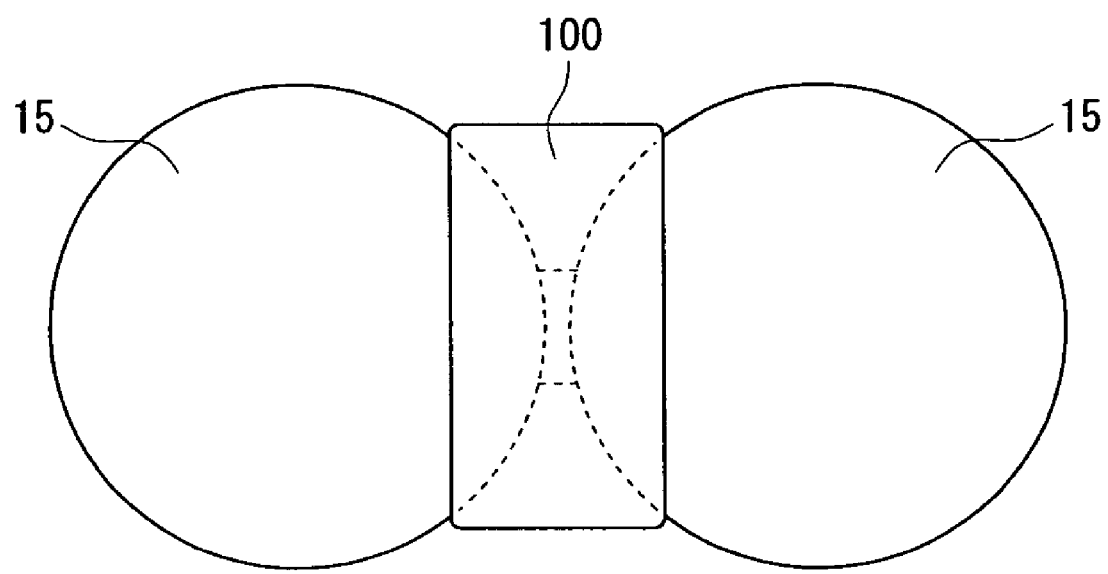

BALL SCREW DEVICE

TECHNICAL FIELD

The present invention concerns a ball screw device used, for example, in industrial machines.

BACKGROUND ART

In the existent ball screw device of this type, a nut having a thread groove at the inner circumferential surface is screw coupled with the screw shaft having a thread groove at the outer circumferential surface and extending in the axial direction, the thread groove corresponding to the thread groove of screw shaft, in which the thread groove of the nut and the thread groove of the screw shaft are opposed to each other to define a spiral load raceway between both of them. A plurality of balls loaded rollably as rolling elements along the load raceway, and the nut (or screw shaft) moves axially by the rotation of the screw shaft (or nut) by way of rolling movement of the balls.

By the way, when the nut (or screw shaft) moves in the axial direction, the balls move under rolling along the spiral load raceway formed between both of the thread grooves, and it is necessary to infinitely circulate the balls in order to continuously move the nut (or the screw shaft).

As a system for infinite circulation of the balls, a circulation tube type, an end cap type or the like is general. In the compact type ball screw device, an axially penetrating ball return passage is formed to the nut, a recess to which the end of the ball return passage opens is formed to the end of the nut, and a circulation block having a ball circulation groove is fitted and secured to the recess for communication ball return channel and the load raceway between both of the thread groove, thereby circulating the balls infinitely.

By the way, while a ball running surface of a width larger than the ball diameter for constituting, together with the ball circulation groove in the circulation block, a ball circulation passage is provided to the recess formed to the end surface of the nut, the ball running surfaces is used as an inner surface directing the radial direction of the recess and, accordingly, the ball circulation groove of the circulation block is also formed to the radially directing surface so as to oppose to the ball running surface, and thick walled portions are disposed to both axial sides of the ball circulation groove respectively. However, in a case where the thick walled portions are disposed on both axial sides of the ball circulation groove of the circulation block, in a ball screw device with a small lead screw with narrow inter thread groove distance or a ball screw device of multi thread screw, a portion of the recess of the nut corresponding to the thick walled portions in the axial inside of the ball circulation groove may sometimes interfere the adjacent thread grooves (on the side of nut), to provide a disadvantage not capable of coping with the improvement of the load capacity by the increase in the size of the ball diameter and the number of threads.

Further, in the circulation block, while the block main body having the ball circulation groove is generally provided with a scoop-up portion of scooping up the balls rolling between both of the thread grooves to the ball circulation passage integrally, since the scoop-up portion is inserted and arranged to the thread groove of the screw shaft, in a case where the thread groove for the screw shaft is cut leaving the axial end (in a case where the thread groove is not formed as far as the end face of the screw shaft), it results in a disadvantage that the circulation block can not be mounted to the recess of the nut in a state of inserting the nut over the screw shaft, making it impossible for assembling the ball screw device.

The present invention has been accomplished for overcoming such a disadvantage and a first object thereof is to provide a ball screw device capable of improving the load capacity by increasing the size of the ball diameter and the number of threads by preventing the recess of the nut from interfering thread grooves adjacent to the recess even in the thread groove of a small lead screw and a multiple thread screw.

A second object of the present invention is to provide a ball screw device capable of easily mounting a circulation block to the recess of the nut in a state of inserting the nut over a screw shaft even in a case where the thread groove of the screw shaft is cut leaving the axial end.

DISCLOSURE OF THE INVENTION

For attaining the first object, an embodiment of the invention has a feature in a ball screw device comprising a screw shaft having a spiral thread groove at an outer circumferential surface, a nut screw coupled with the screw shaft having a thread groove corresponding to the thread groove of the screw shaft at an inner circumferential surface and having a ball return passage penetrating in the axial direction and a recess at each end to which the end of the ball return passage opens, a circulation block fitted and secured to the recess of the nut for forming, together with the recess, a ball circulation passage that communicates both of the thread grooves with the ball return passage, and a plurality of balls disposed circulately under rolling through both of the thread grooves, the ball circulation passage, and the ball return passage, wherein the axially facing surface of the recess is used as a ball running surface, a ball circulation grooves is formed at a portion of the circulation block opposing to the ball running surface, and the ball circulation passage is formed by the ball circulation groove and the ball running surface.

For attaining the second object, an embodiment of the invention has a ball screw device comprising a screw shaft having a spiral thread groove at an outer circumferential surface, a nut screw coupled with the screw shaft having a thread groove corresponding to the thread groove of the screw shaft at an inner circumferential surface and having a ball return passage penetrating in the axial direction and a recess at each end to which the end of the ball return passage opens, a circulation block fitted and secured to the recess of the nut for forming, together with the recess, a ball circulation passage that communicates both of the thread grooves with the ball return passage, and a plurality of balls disposed circulately under rolling through both of the thread grooves, the ball circulation passage, and the ball return passage, wherein the circulation block comprises a block main body having a ball circulation groove for forming, together with the recess, the ball circulation passage and a scoop-up portion for scooping up the balls rolling between both of the thread grooves to the ball circulation passage, in which the scoop-up portion and the block main body are formed as separate members.

The invention also has a feature, wherein the block main body and the scoop-up portion are formed of different materials.

For attaining the second object, an embodiment of the invention has a feature in a ball screw device comprising a screw shaft having a spiral thread groove at an outer circumferential surface, a nut screw coupled with the screw shaft having a thread groove corresponding to the thread groove of the screw shaft at an inner circumferential surface and having a ball return passage penetrating in the axial direction and a recess at each end to which the end of the ball return passage opens, a circulation block fitted and secured to the recess of the nut for forming, together with the recess, a ball circulation passage that communicates both of the thread grooves with the ball return passage, and a plurality of balls disposed circulately under rolling through both of the thread grooves, the ball circulation passage, and the ball return passage, wherein the circulation block is formed only of a portion having the ball circulation groove for forming, together with the recess, the ball circulation passage, and is not provided with a scoop-up portion that scoops up the balls rolling between both of the thread grooves to the ball circulation passage.

The invention also has a feature, wherein the circulation block is a molded product of a sintered metal.

BRIEF DESCRIPTION OF THE DRAWINGS

FIGS. 2A and 2B are views showing an example of a circulation block in which FIG. 2A is a view being observed from radial inward and FIG. 2B shows a right side elevation of FIG. 2A being observed from axial outward.

FIGS. 3A and 3B are views showing the block main body of the circulation block of FIGS. 2A and 2B in which FIG. 3A is a view being observed from radial inward and FIG. 3B shows a right side elevation of FIG. 3A being observed from axial outward.

FIGS. 4A to 4C are views showing a scoop-up portion of the circulation block of FIGS. 2A and 2B in which FIG. 4A is a view being observed from radial inward, FIG. 4B is a right side elevational view of FIG. 4A, and FIG. 4C is a cross sectional taken along line Y-Y in FIG. 4B.

FIGS. 7A and 7B are views showing a modified embodiment of the scoop-up portion in which FIG. 7A is a view being observed from radial inward, and FIG. 7B is a right side elevational view of FIG. 7A.

FIGS. 9A and 9B are views showing a circulation block used in a ball screw device as a second embodiment of the present invention in which FIG. 9A is a view being observed from radial inward, FIG. 9B shows a right side elevation of FIG. 9A, observed from axial outward.

FIG. 10A and FIG. 10B are views showing the block main body of the circulation block of FIGS. 9A and 9B in which FIG. 10A is a view being observed from radial inward and FIG. 10B shows a right side elevation of FIG. 10A being observed from axial outward.

FIGS. 11A to 11C are views showing a scoop-up portion of the circulation block of FIGS. 9A and 9B in which FIG. 11A is a view being observed from radial inward, FIG. 11B is a right side elevational view of FIG. 11A, and FIG. 11C is a cross sectional taken along line Y-Y in FIG. 11B.

FIGS. 14A and 14B are views showing a modified embodiment of the circulation block of FIGS. 9A and 9B in which FIG. 14A is a view observing the block main body from radial inward and FIG. 14B is a right side elevational view of FIG. 14A.

FIGS. 15A and 15B are views showing a modified embodiment of the circulation block of FIGS. 9A and 9B in which FIG. 15A is a view observing the scoop-up portion from radial inward and FIG. 15B is a right side elevational view of FIG. 15A.

FIG. 17 is a view for explaining a retaining piece.

Figure 1:
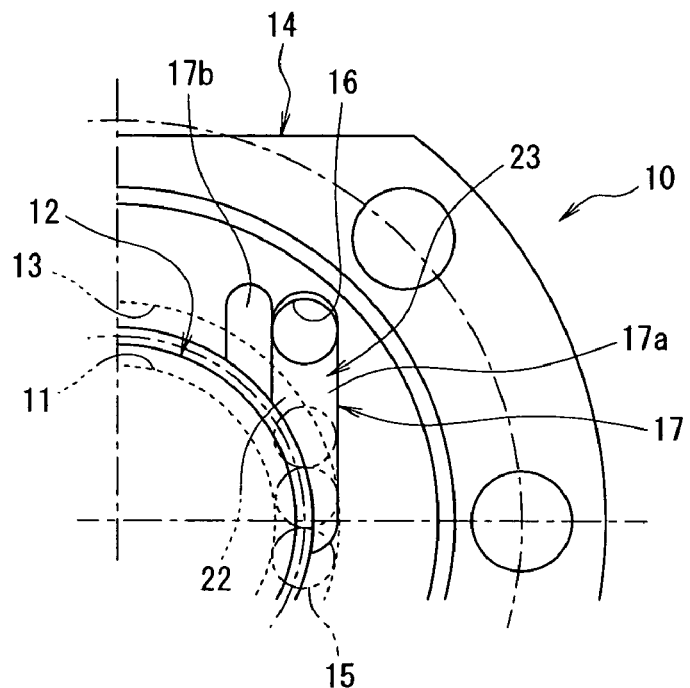
FIG. 1 is an explanatory view for explaining a main portion of a ball screw device as a first embodiment of the present invention.

EXPLANATION FOR REFERENCES 10 ball screw device
11 thread groove (on the side of thread shaft)
12 screw shaft
13 thread groove (on the side of nut)
14 nut
15 ball
16 ball return passage
17 recess
18 circulation block
18a block main body
18b scoop-up portion
20 ball circulation groove
21 ball circulation passage
23 ball running surface

BEST MODE FOR PRACTICING THE INVENTION

Figures 2A, 2B:
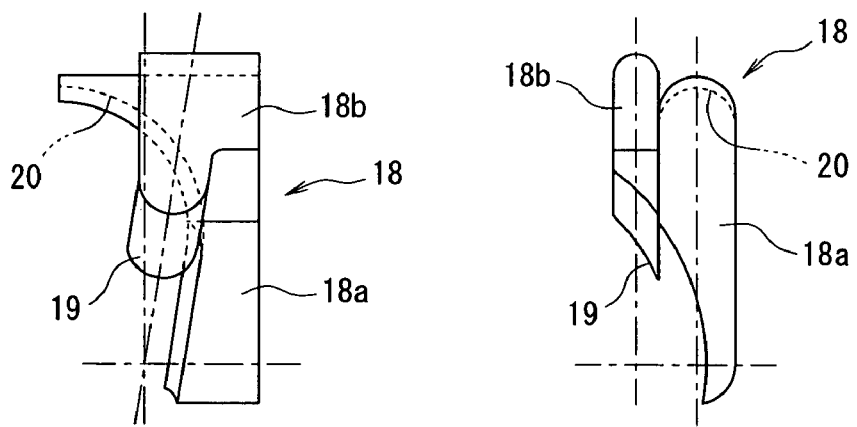
Figure 3A:
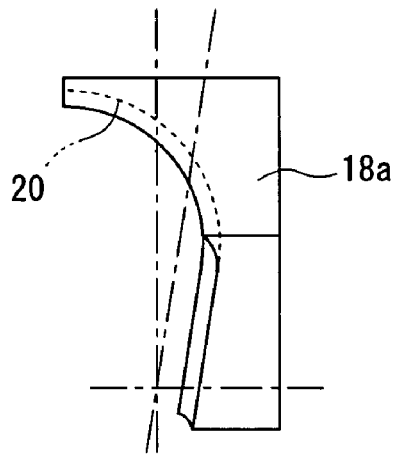
Figure 3B:
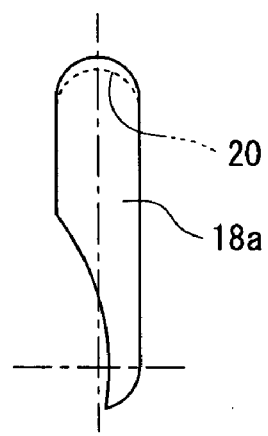
Figure 4A:
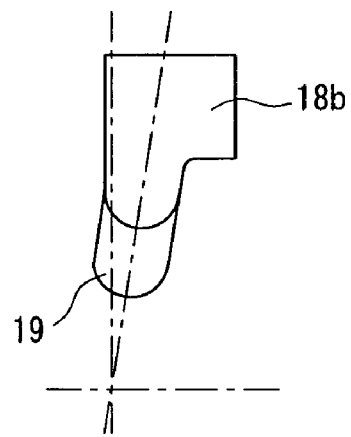
Figure 4B:
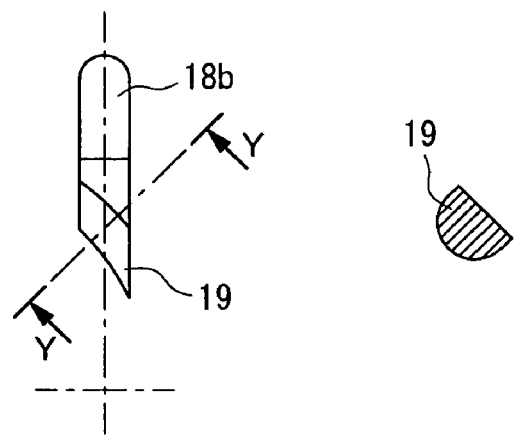
Figure 4C:
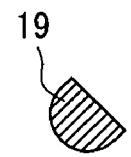
Figure 5:
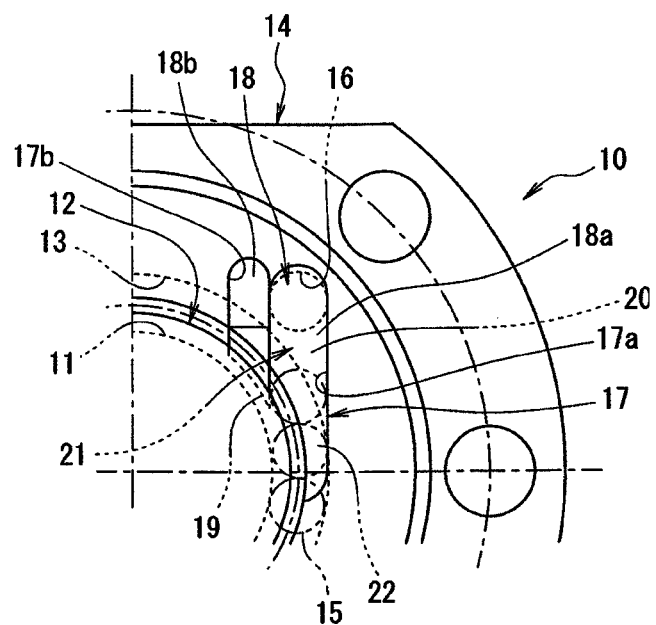
FIG. 5 is a view showing a state of fitting the circulation block of FIGS. 2A and 2B to a recess of a nut.
Figure 6:
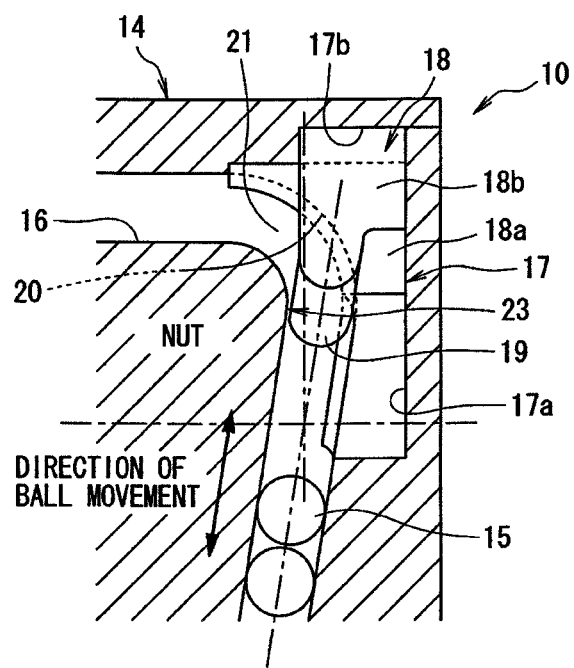
FIG. 6 is a cross sectional view along the axial direction of the circulation block of FIG. 5.
Figure 7A:
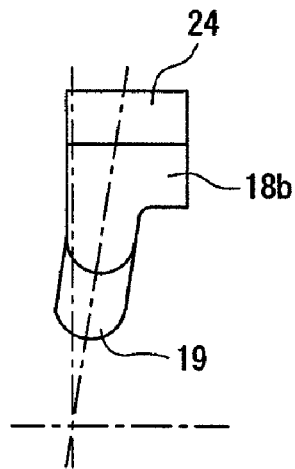
Figure 7B:
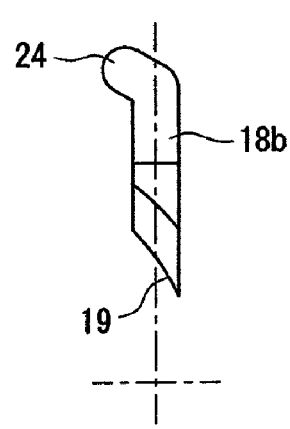
Figure 8:
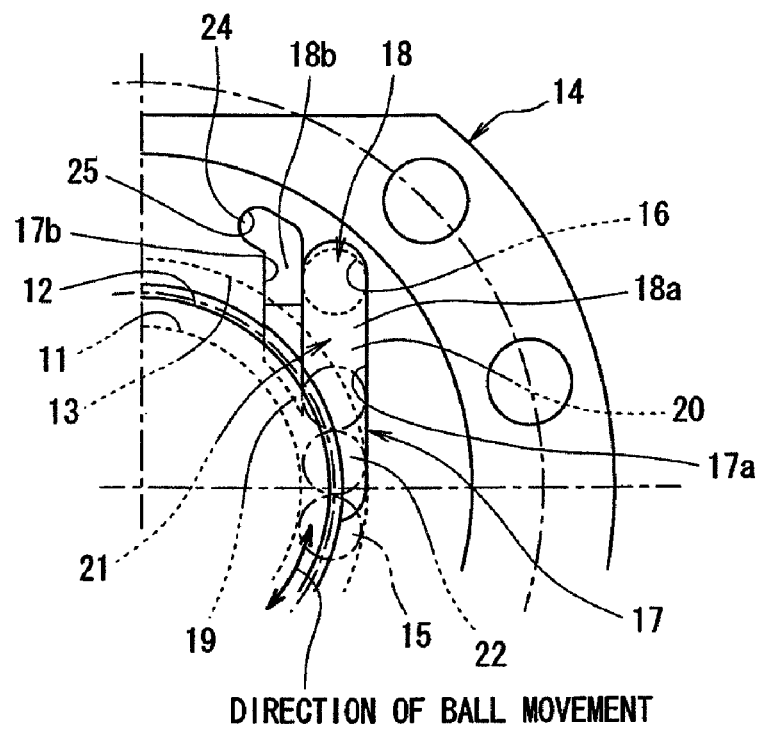
FIG. 8 is a view showing the state of fitting a circulation block having the scoop-up portion of FIGS. 7A and 7B to the recess of a nut.
Figure 16:
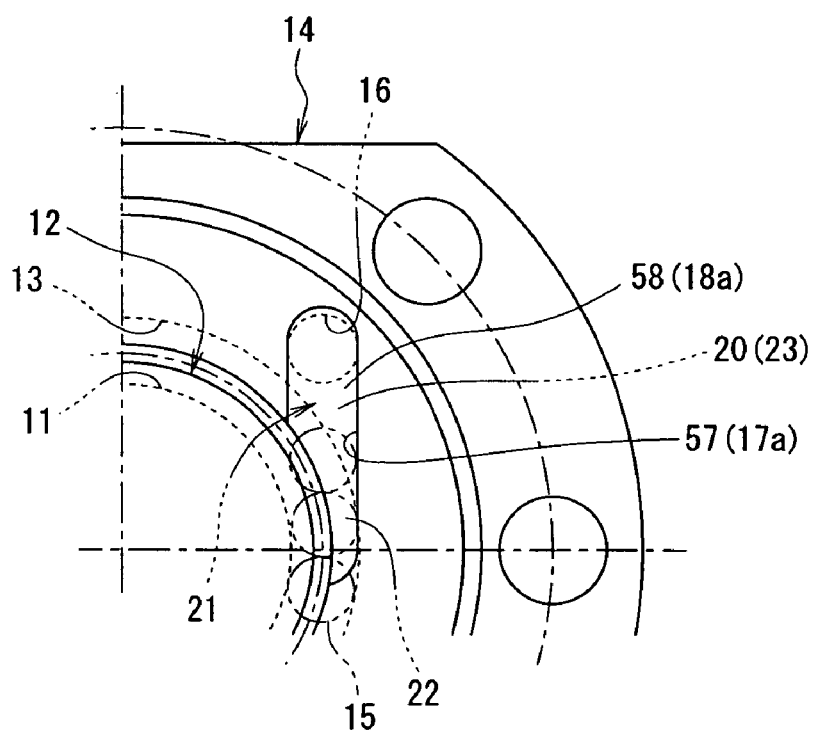
FIG. 16 is an explanatory view for explaining a main portion of a ball screw device as a third embodiment of the present invention.

Preferred embodiments of the present invention are to be described with reference to the drawings. FIG. 1 is an explanatory view for explaining a main portion of a ball screw device as a first embodiment of the present invention, FIGS. 2A and 2B are views showing an example of a circulation block, FIGS. 3A and 3B are views showing a block main body of a circulation block of FIGS. 2A and 2B, FIGS. 4A to 4C are views showing a scoop-up portion of the circulation block of FIGS. 2A and 2B, FIG. 5 is a view showing a state of fitting the circulation block of FIGS. 2A and 2B to the recess of a nut, FIG. 6 is a cross sectional view along the axial direction of the circulation block of FIG. 5, FIGS. 7A and 7B are views showing a modified embodiment of scoop-up portion, FIG. 8 is a view showing the state of fitting a circulation block having the scoop-up portion of FIGS. 7A and 7B to the recess of a nut, FIGS. 9A and 9B to FIGS. 15A and 15B are views for explaining a ball screw device as a second embodiment of the present invention, FIG. 16 is a view for explaining a main portion of a ball screw device as a third embodiment of the present invention, and FIG. 17 is a view for explaining a retaining piece.

In a ball screw device 10 as a first embodiment of the present invention, as shown in FIG. 1, a nut 14 having a spiral thread groove 13 at an inner circumferential surface is screw coupled with a screw shaft 12 having a spiral thread groove 11 at an outer circumferential surface and extending in the axial direction, the thread groove corresponding to the thread groove 11. The thread groove 13 of the nut 14 and the thread groove 11 of the screw shaft 12 are opposed to each other to constitute a load raceway between them and a number of balls 15 are loaded as rolling elements rollably to the loading raceway.

An axially penetrating ball return passage 16 is formed to the wall of the nut 14, and recesses 17 are formed to both ends of the nut 14 respectively. A circulation block 18 having a curved ball circulation groove 20 for forming, together with the recess 17, a ball circulation passage 21 that communicates the ball return passage 16 and the load raceway between both of the thread grooves 11 and 13 is fitted and secured to the recess 17 (refer to FIG. 5 and FIG. 6)

The circulation block 18 is made, for example, of an injection molding product of a synthetic resin and it comprises a block main body 18a having the ball circulation groove 20 and a scoop-up portion 18b having, at the top end, a tongue portion 19 for scooping up balls 15 rolling along the load raceway between both of the thread grooves 11 and 13 to the ball circulation passage 21.

In this embodiment, as shown in FIGS. 3A and 3B, and FIGS. 4A to 4C, the scoop-up portion 18b and the block main body 18a of the circulation block 18 are formed as members separate from each other and, in a state of fitting to the recess 17, the scoop-up portion 18b is disposed with the tongue portion 19 being inserted in the thread groove 11 of the screw shaft 12, the block main body 18a is disposed to the radial outward of the scoop-up portion 18b and they are joined to each other in the radial direction.

The recess 17 has a first fitting portion 17a having an arcuate portion 22 along the side wall of the thread groove 13 of the nut 14 and fitted with the block main body 18a of the circulation block 18, and a second fitting portion 17b fitted with the scoop-up portion 18b, in which the end of the ball return passage 16 opens to the bottom face of the first fitting portion 17a (face directing the axial direction of the recess). The first fitting portion 17a is fabricated by a ball end mill, by which the ball return passage 16 and the load raceway between both of the thread grooves 11 and 13 are connected smoothly with no step by the ball circulation passage 21.

In this embodiment, the bottom face of the first fitting portion 17a is used a ball running surface 23, the ball circulation groove 20 of the circulation block 18 is formed at a portion opposed to the ball running surface 23, and the ball circulation passage 21 is formed by the ball circulation groove 20 and the ball running surface 23. Further, while the groove shape of the ball circulation groove 20 has no particular restriction, a portion in the ball circulation groove 20 other than the portion opposed to the arcuate portion 22 is formed as a single circular groove (which may also be a gothic arch groove or V-shaped groove) at 90 to 180° (180° in the drawing), and the portion opposed to the arcuate portion 22 is formed as an arcuate groove at about 90° which is about by one-half of the single circular groove.

Then, an infinite circulate passage for the balls 15 is formed by the ball circulation passage 21, the load raceway between both of the thread grooves 11 and 13, and the ball return passage 16, by which the nut 14 (or the screw shaft 12) continuously moves axially by way of rolling movement of the balls 15 when the screw shaft 12 (or nut 14) is rotated.

As a described above, in this embodiment, since the bottom face of the first fitting portion 17a which is a surface axially directing to the recess 17 is used as the ball running surface 23, the ball circulation groove 20 for the circulation block 18 is formed at a position opposing to the ball running surface 23, and the ball circulation passage 21 is formed by the ball circulation groove 20 and the ball running surface 23, this provides a shape in which the axial inside portion of the ball circulation groove 20 is recessed. Accordingly, even in a case of a thread groove of a small lead screw or a multiple thread screw with a narrow thread groove pitch, this can prevent the recess 17 of the nut 14 from interfering adjacent thread groove 13 and, as a result, it is possible to improve the load capacity of the ball screw device 10 by increasing the size of the ball diameter and the number of threads.

Further, since the scoop-up portion 18b and the block main body 18a of the circulation block 18 are formed as members separate from each other, even in a case where the thread groove 11 of the thread screw 12 is cut leaving the axial end of the thread groove 11 (that is in a case where the thread groove 11 is not formed as far as the end face of the screw shaft 12), the circulation block 18 can be mounted to the recess 17 of the nut 14 in a state of inserting the nut 14 over the screw shaft 12 and, as a result, the ball screw device 10 can assembled easily.

FIGS. 7A and 7B, and FIG. 8 show an example in which a protrusion 24 for fixing is disposed to the scoop-up portion 18b of the circulation block 18, and a concave portion 25 fitted with the protrusion 24 is added to the second fitting portion 17b of the recess 17 of the nut 14, by which the circulation block 18 can be retained in the radial direction and the circumferential direction within the recess 17 to increase the fixing force.

Then, a ball screw device as a second embodiment of the present invention is to be described with reference to FIGS. 9A and 9B to FIGS. 15A and 15B.

Figure 12:
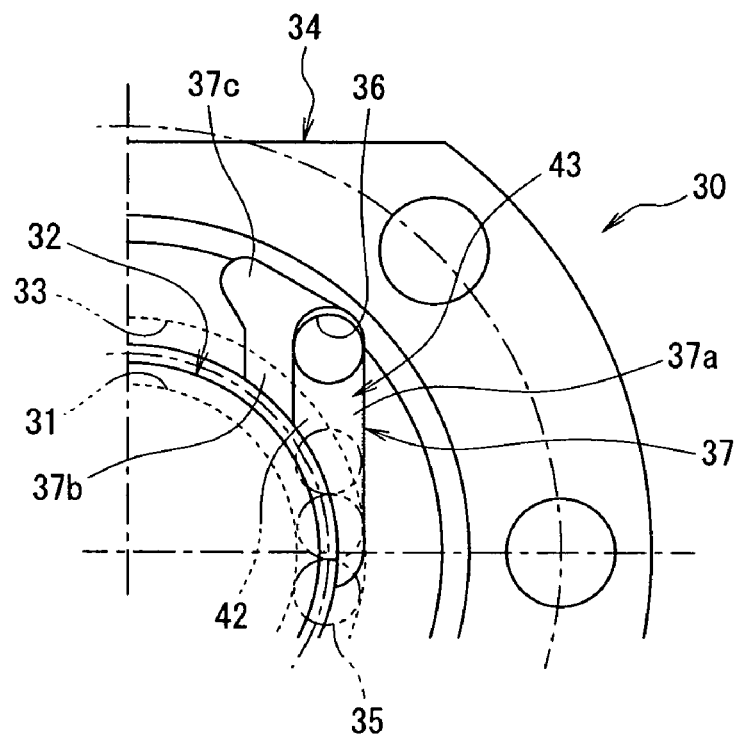
FIG. 12 is a view showing the recessed shape of a nut to which the circulation block of FIGS. 9A and 9B is fitted.
Figure 13:
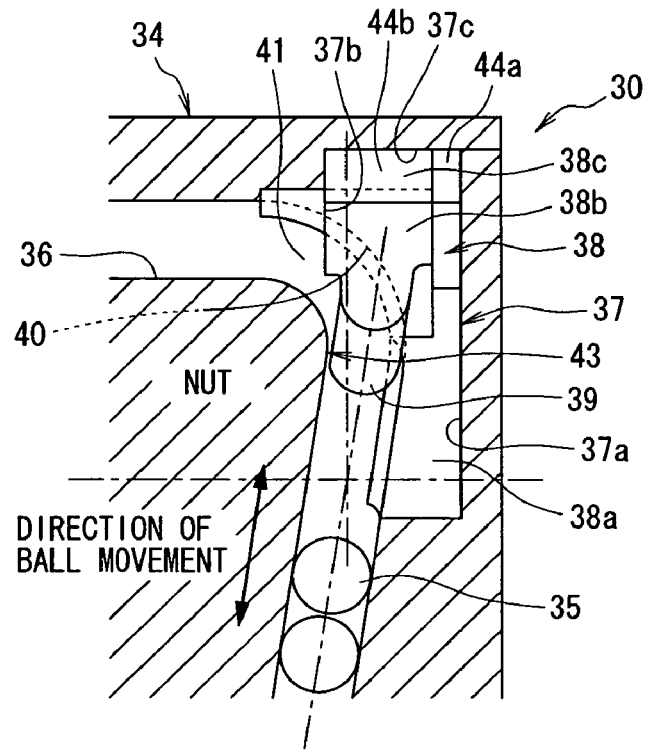
FIG. 13 is a cross sectional view along the axial direction in a state of fitting the circulation block of FIGS. 9A and 9B to the recess of the nut of FIG. 12.
Figure 14A:
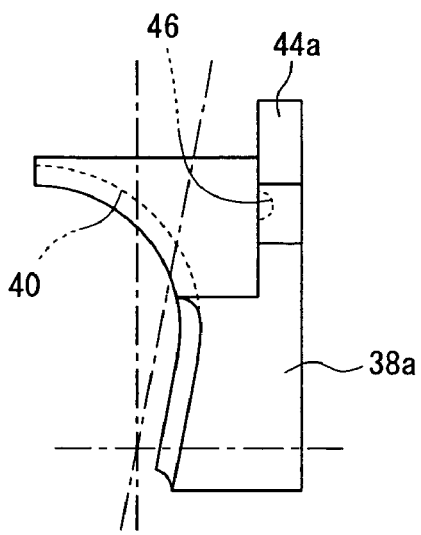
Figure 14B:
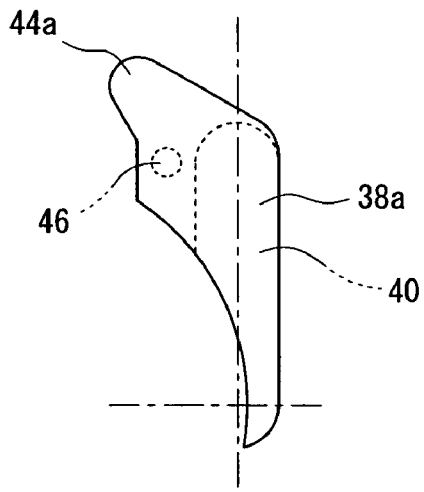
Figure 15A:
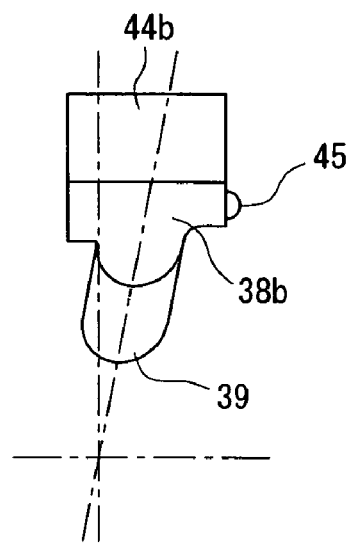
Figure 15B:
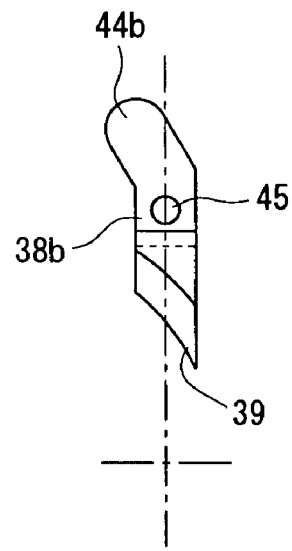

In a ball screw device 30 as a second embodiment of the present invention, as shown in FIG. 12 and FIG. 13, a nut 34 having a spiral thread groove 33 at an inner circumferential surface is screw coupled to a screw shaft 32 having a spiral thread groove 31 at an outer circumferential surface and extending in the axial direction, the thread groove corresponding to the thread groove 31. The thread groove 33 of the nut 34 and the thread groove 31 of the screw shaft 32 are opposed to each other to constitute a load raceway between them and a number of balls 35 are loaded as rolling elements rollably to the loading raceway.

Figure 9A:
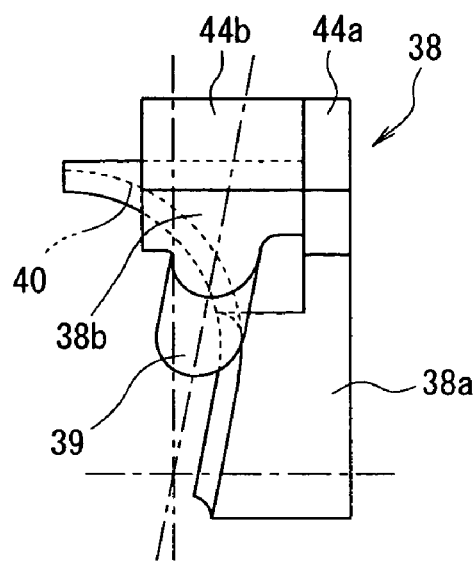
Figure 9B:
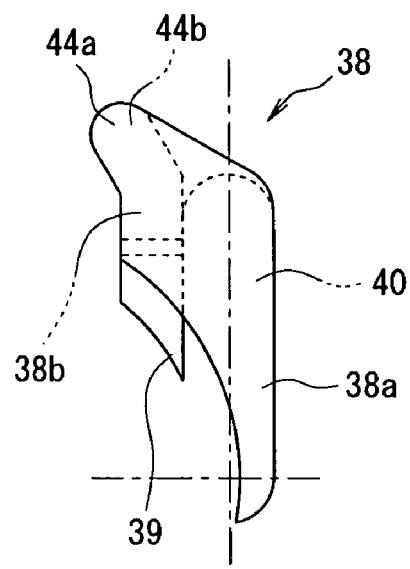
Figure 10A:
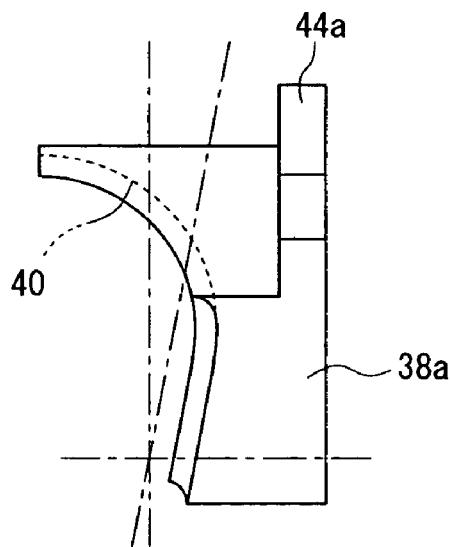
Figure 10B:
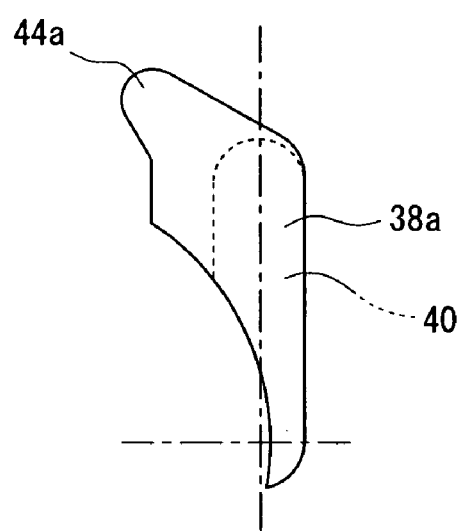
Figures 11A, 11B, 11C:
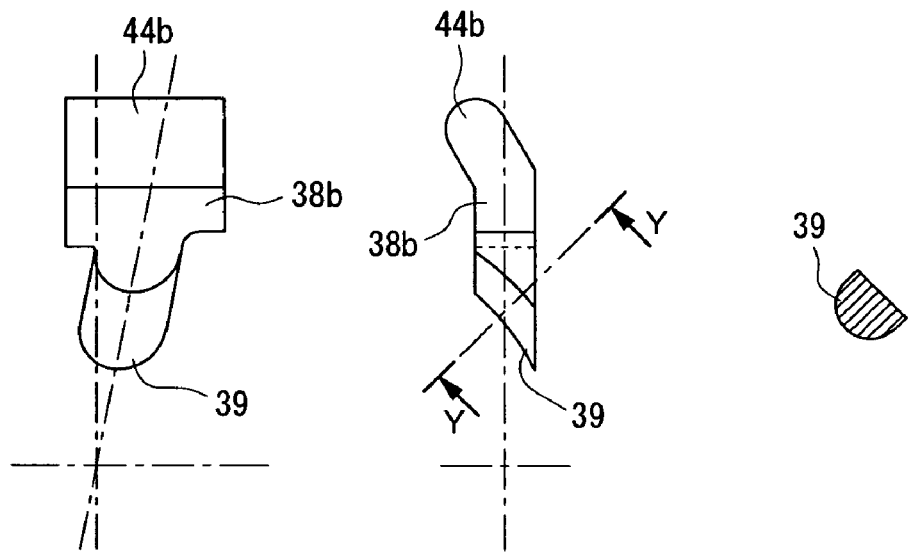

Further, an axially penetrating ball return passage 36 is formed to the wall of the nut 34, and recess 37 are formed to both ends of the nut 34 respectively. A circulation block 38 having a curved ball circulation groove 40 forming, together with the recess 37, a ball circulation passage 41 that communicates the ball return passage 36 and the load raceway between both of the thread grooves 31 and 33 is fitted and secured to the recess 37. The circulation block 38 is made, for example, of an injection molding product of a synthetic resin and it comprises a block main body 38a having the ball circulation groove 40 and a scoop-up portion 38b having, at the top end, a tongue portion 39 for scooping up balls 35 rolling along the load raceway between both of the thread grooves 31 and 33 to the ball circulation passage 41 as shown in FIGS. 9A and 9B.

In this embodiment, as shown in FIGS. 10A and 10B, and FIGS. 11A to 11C, the scoop-up portion 38b and the block main body 38a of the circulation block 38 are formed as members separate from each other and, in a state of fitting to the recess 37, the scoop-up portion 38b is disposed with the tongue portion 39 being inserted in the thread groove 31 of the screw shaft 32, the block main body 38a is disposed to the radial outward and the axial outward of the scoop-up portion 38b and they are joined to each other in the radial direction and the axial direction. Further, fixing protrusion 44a and 44b overlapping with each other in the axial direction are disposed to the block main body 38a and the scoop-up portion 38b of the circulation block 38.

The recess 37 has a first fitting portion 37a having an arcuate portion 42 along the side wall of the thread groove 33 of the nut 34 and fitted with the portion other than the join portion in the axial direction with the block main body 38a of the circulation block 38, a second fitting portion 37b fitted with the scoop-up portion 38b together with the join portion in the axial direction of the block main body 38a, and a third fitting portion 37c fitted with the fixing protrusions 44a and 44b, and in which the end of the ball return passage 36 opens to the bottom face of the first fitting portion 37a (face directing the axial direction of the recess). By fitting the fixing protrusions 44a and 44b to the third fitting portion 37c, the circulation block 38 is retained in the radial direction and in the circumferential direction to increase the fixing force. The first fitting portion 37a is fabricated by a ball end mill, by which the ball return passage 36 and the load raceway between both of the thread grooves 31 and 33 are connected smoothly with no step by the ball circulation passage 41.

In this embodiment, the bottom face of the first fitting portion 37a is used a ball running surface 43, the ball circulation groove 40 of the circulation block 38 is formed at a portion opposed to the ball running surface 43, and the ball circulation passage 41 is formed by the ball circulation groove 40 and the ball running surface 43. Further, while the groove shape of the ball circulation groove 40 has no particular restriction, a portion in the ball circulation groove 40 other than the portion opposed to the arcuate portion 42 is formed as a single circular groove (which may also be a gothic arch groove or V-shaped groove) at 90 to 180° (180° in the drawing), and the portion opposed to the arcuate portion 22 is formed as an arcuate groove of about 90° which is about by one-half of the single circular groove.

Then, an infinite circulate passage for the balls 35 is formed by the ball circulation passage 41, the load raceway between both of the thread grooves 31 and 33, and the ball return passage 16, by which the nut 34 (or the screw shaft 32) continuously moves axially by way of rolling movement of the balls 35 when the screw shaft 32 (or the nut 34) is rotated.

FIGS. 14A and 14B, and FIGS. 15A and 15B are an example of making the joining between the scoop-up portion 38b and a block main body 38a reliable by providing a protrusion 45 to the scoop-up portion 38b and a concave portion 46 to the block main body 38a in the axial joining portion between the scoop-up portion 38b and the block main body 38a of the circulation block 38, and fitting the protrusion 45 to the concave portion 46.

Each of the constitutions in the ball screw device of the invention is not restricted only to each of the embodiments described above but can be properly modified within a range not departing the gist of the invention.

For example, a circulation block having the scoop-up portion is shown as an example in each of the embodiments described above but, instead, it may also be adapted as shown in FIG. 16 such that the scoop-up portion 18b in the first embodiment is not provided but a circulation block 58 is constituted only with the block main body 18a, the recess 57 is constituted only with the first fitting portion 17a in the first embodiment and a circulation block 58 is fitted to the recess 57.

Also in this embodiment, like the first embodiment described above, in a case where the thread groove 11 of the screw shaft 12 is cut leaving the axial end (in a case where the thread groove 11 is not formed as far as the end of the screw shaft 12), the circulation block 58 can be mounted to the recess 57 of the nut 14 in a state of screw coupling the nut 14 with the screw shaft 12 and, as a result, the ball screw device can be assembled easily. Those portions duplicated with the first embodiment carry same reference numerals, for which descriptions are to be omitted.

Further, an example of a circulation block made of a synthetic resin is shown in each of the embodiments but, instead, the circulation block may be formed with a molded product of a sintered metal and can be used suitably to an application with stringent demand for the heat resistance or the strength.

Further, while an example of forming the block main body and the scoop-up portion of the circulation block with an identical material is shown as an example in the embodiment described above, the operability of the device can be improved by properly selecting materials coping with the functions that are most required for each of the portions such as by using a material of excellent impact resistance for the scoop-up portion and a material of excellent wear resistance for the block main body.

Further, a retaining piece 100 having a concave surface such as an arcuate or conical shape may also be intervened on both lateral surfaces opposing to the ball 15 as shown in FIG. 17 between each of plural balls 15 rolling along a load raceway between both of the thread grooves 11 and 13 with the aim of eliminating the sounds of collision between balls to each other thereby reducing noises during driving. Further, the retaining piece may be either a type disposed individually between each of the balls 15, or a type in which the retaining pieces are connected with each other.

INDUSTRIAL APPLICABILITY

As apparent from the foregoing descriptions, the invention can provide an effect capable of improving the load capacity of a ball screw device by increasing the size of the ball diameter or the number of threads even in a case of the thread groove of a small lead screw or a multiple thread screw with a narrow thread groove pitch since interference of the recess of the nut to adjacent thread grooves can be prevented.

The invention can provide an effect capable of assembling a ball screw device easily since the circulation block can be mounted to the recess of the nut in a state of inserting the nut over the screw shaft even in a case where the thread groove of a screw shaft is cut leaving the axial end.

The invention can provide an effect capable of improving the operability of the device, since materials conforming with the functions that are required most for each of the portions can be selected.

The invention can provide an effect capable of being used suitably to an application use in which severe demands for heat resistance and the strength are required.

The invention claimed is:

1. A ball screw device comprising a screw shaft having a first thread groove being a spiral thread groove at an outer circumferential surface:
   a nut screw coupled with the screw shaft, having a second thread groove being another spiral thread groove opposing the first thread groove of the screw shaft at an inner circumferential surface, and having a ball return passage penetrating through the nut screw in an axial direction, and further having a recess in the nut screw opened at each end of the ball return passage;
   a circulation block comprising a block main body having a ball circulation groove and a scoop-up portion fitted and secured to the recess of the nut screw; and
   a plurality of balls disposed between the first thread groove and second thread groove,
   wherein a ball circulation passage, for communicating both the first thread groove and second thread groove with the ball return passage, includes the ball circulation groove and a ball running surface provided on the recess to face the ball circulation groove, wherein an infinite circulate passage for the plurality of balls is formed by the ball circulation passage and a load raceway between the first thread groove and the second thread groove, wherein the scoop-up portion of the circulation block scoops up the plurality of balls, and the scoop-up portion and the block main body are formed as separate members, wherein the block main body has a first fixing protrusion, the scoop-up portion has a second fixing protrusion, and the nut screw has a fitting portion fitted with the first fixing protrusion and second fixing protrusion, whereby the circulation block and the nut screw are fit in the radial direction and in the circumferential direction, wherein the scoop-up portion has a protrusion and the block main body has a concave portion that joins the protrusion, and wherein the recess includes an arcuate portion along a side wall of the second thread groove of the nut, the fitting portion of the nut screw having a first fitting portion fitted with the block main body of the circulation block and a second fitting portion fitted with the scoop-up portion, and an end of the ball return passage opens at a bottom face of the first fitting portion of the nut screw.

2. The ball screw device according to claim 1, wherein the circulation block is a molded product of a sintered metal.

* * * * *